US009545652B2

(12) United States Patent
Zuo et al.

(10) Patent No.: US 9,545,652 B2
(45) Date of Patent: Jan. 17, 2017

(54) BIOREMEDIATION OF HYDROCARBON-CONTAMINATED SOIL

(71) Applicants: Yi Zuo, San Ramon, CA (US); Zhiyong Jason Ren, Boulder, CO (US); Song Jin, Fort Collins, CO (US)

(72) Inventors: Yi Zuo, San Ramon, CA (US); Zhiyong Jason Ren, Boulder, CO (US); Song Jin, Fort Collins, CO (US)

(73) Assignee: Chevron U.S.A. Inc., San Ramon, CA (US)

( * ) Notice: Subject to any disclaimer, the term of this patent is extended or adjusted under 35 U.S.C. 154(b) by 84 days.

(21) Appl. No.: 14/301,168

(22) Filed: Jun. 10, 2014

(65) Prior Publication Data

US 2015/0352609 A1    Dec. 10, 2015

Related U.S. Application Data

(60) Provisional application No. 62/010,140, filed on Jun. 10, 2014.

(51) Int. Cl.
*H01M 8/16* (2006.01)
*B09C 1/08* (2006.01)
*B09C 1/10* (2006.01)

(52) U.S. Cl.
CPC ............. *B09C 1/085* (2013.01); *B09C 1/10* (2013.01); *H01M 8/16* (2013.01); *Y02B 90/14* (2013.01)

(58) Field of Classification Search
None
See application file for complete search history.

(56) References Cited

U.S. PATENT DOCUMENTS 3,278,335 A * 10/1966 Hitzman ................ H01M 8/16
166/246
2012/0276418 A1 * 11/2012 Zhou ........................ B09C 1/10
429/2

OTHER PUBLICATIONS

Lu, et al., "Enhanced bioremediation of hydrocarbon-contaminated soil using pilot-scale bioelectrochemical systems", 274 J. Hazardous Mat. (2014), pp. 8-15.
Yuan, et al., "A new approach to in situ sediment remediation based on air-cathode microbial fule cells", 10 J. Soils Sediments (2010), pp. 1427-1433.
Huggins, et al., "Biochar as a sustainable electrode material for electricity production in microbial fuel cells" 157 Bioresour. Technol. (2014), pp. 114-119.
Wang, et al., "Recycled tire crumb rubber anodes for sustainable power production in microbial fule cells", 196 J. Power Sources (2011), pp. 5863-5866.
Kettler, et al., "Simplified Method for Soil Particle-Size Determination to Accompany Soil-Quality Analyses", 65 Soil Sci. Soc. Am. J. (2001), pp. 849-852.

(Continued)

*Primary Examiner* — Yoshitoshi Takeuchi (57) ABSTRACT

A method for using a bioelectrochemical system for the remediation of contaminated substrates is disclosed. The system is partially submerged into the contaminated substrates and stimulates electron transfer by microbial species in order to degrade contaminating hydrocarbons in the substrate, including vadose zone substrates. A method for the generation of electricity using bioelectrochemical reaction in contaminated substrates is also disclosed.

13 Claims, 8 Drawing Sheets

(56) References Cited

OTHER PUBLICATIONS

Walkley, et al., "An examination of the Degtjareff method for determining soil organic matter, and a proposed modification of the chromic acid titration method", 37 Soil Sci. (1934), pp. 29-38.

Bianchi et al., "Relationship between the Mass of Organic Matter and Carbon in Soil" 51(2) Braz. Arch. Biol. Technol. (2008), pp. 263-269.

Mussa, et al.,"Determination of Available Nitrate, Phosphate and Sulfate in Soil Samples", 1 Int. J. PharmTech Res. (2009), pp. 598-604.

Luo, et al., "Long-term performance and characterization of microbial desalination cells in treating domestic wastewater", 120 Bioresour. Technol. (2012), pp. 187-193.

Weidong, et al., "Status quo of soil petroleum contamination and evolution of bioremediation", 8 Petro. Sci. (2011), pp. 502-514.

\* cited by examiner

BIOREMEDIATION OF HYDROCARBON-CONTAMINATED SOIL

This application claims priority under 35 U.S.C. §119(e) of U.S. Provisional Patent Application No. 62/010,140, filed Jun. 10, 2014. The entirety of all of the aforementioned application is incorporated herein by reference.

FIELD OF THE INVENTION

This application generally relates to remediation of contaminated substrates. In particular, the invention relates to bioelectrochemical systems for the remediation of hydrocarbon-contaminated soil.

BACKGROUND AND SUMMARY OF THE INVENTION

Soil contamination by petroleum hydrocarbon compounds continues to be a common occurrence, with such contamination occurring both naturally and from, for example, storage tanks. Unfortunately, the cleanup of such contamination is both costly and can be potentially hazardous to those performing the cleanup. Typically, unless the contamination exposes immediate harm to human and ecological health, remediation methods that result in the least land alteration are usually preferred.

In situ bioremediation is often a cost-effective and non-intrusive method for treating petroleum hydrocarbon-contaminated soils and has been utilized for decades. To enhance in situ bioremediation, typical measures include bioaugmentation with certain microbial species and stimulating indigenous microorganisms by injecting amendments that have been depleted in the contaminated matrices. For complete biodegradation of organic contaminants, the availability of terminal electron acceptors (e.g., $O_2$, $NO_3^-$, $SO_4^{2-}$) is usually important. For example, to enhance aerobic degradation of contaminants, air is usually sparged to replenish $O_2$ that is depleted. Unfortunately, the addition of oxygen releasing compounds or alternative electron acceptors can be energy and cost intensive.

Compared with external electron acceptor supplement, bioelectrochemical systems (BESs), such as microbial fuel cells (MFCs), have recently been studied as alternatives to enhance biodegradation of petroleum hydrocarbons. For example, electrochemically active bacteria (EAB) on the anode of an MFC can catalyze the oxidization of organic electron donors such as hydrocarbon and extracellularly transfer electrons to the anode. Electrons are then transferred through an external circuit to a cathode, where typically $O_2$ is reduced to $H_2O$.

Attention for the application of BES for remediation of contaminated soil, groundwater, and sediment has increased in industry. However, the performance of presently known systems is limited by distances from the electrode and/or low water content in the soil and/or medium to be remediated. Accordingly, there exists a need in the art for BESs that can maximize the radius of influence (ROI) from the electrode(s), effectively operate in vadose zone conditions, generate at least enough power in order to make the monitoring of the system self-sufficient, and/or use cost-effective materials for their construction.

The present application provides new technology that will greatly improve groundwater and soil remediation efficiency and reduce costs over a range of different moisture levels and soil compositions, as well as provide effective remediation for a variety of contaminant types.

One aspect of the present application relates to a method for the remediation of a substrate comprising at least one contaminant. The method comprises: contacting a substrate comprising at least one contaminant with a bioelectrochemical system comprising: at least one BES column comprising a central tube having one end open to the an oxygen-containing gaseous environment and a perforated opposite end configured for submersion into substrate; a cathode layer external to said central tube configured for encasing at least a portion of the perforated portion of said central tube; a separator layer external to said cathode layer, wherein said separator layer isolates said cathode layer from substrate; an anode layer external to said separator layer, wherein said separator layer isolates said anode layer from said cathode layer; a containment layer external to said anode layer; and an electrical current interface functionally connecting said anode layer to said cathode layer. The system is then operated to reduce the amount of the at least one contaminant in said substrate.

Another aspect of the present application relates to a method for the generation of electricity via bioelectrochemical reaction. The method comprises contacting a substrate comprising at least one contaminant with a bioelectrochemical system comprising: at least one BES column comprising a central tube having one end open to the an oxygen-containing gaseous environment and a perforated opposite end configured for submersion into substrate; a cathode layer external to said central tube configured for encasing at least a portion of the perforated portion of said central tube; a separator layer external to said cathode layer, wherein said separator layer isolates said cathode layer from substrate; an anode layer external to said separator layer, wherein said separator layer isolates said anode layer from said cathode layer; a containment layer external to said anode layer; and an electrical current interface functionally connecting said anode layer to said cathode layer. The system is then operated to generate electricity.

BRIEF DESCRIPTION OF THE DRAWINGS

The accompanying drawings illustrate one or more embodiments of the present disclosure and, together with the written description, serve to explain the principles of exemplary embodiments of the present disclosure.

FIG. 5A and FIG. 5B are plots based on BES enhanced TPH removal by deducting the value from the baseline natural attenuation. FIG. 5C and FIG. 5D are based on the absolute TPH removal in the reactor. Dashed arrows indicate that maximum ROIs were expanding as reflected by the drop of slopes.

The horizontal axis indicates the soil samples from different locations (distance from electrode), and the vertical axis indicates the removal of the organics of different carbon fractions. A darker or blacker color in a given cell means lower concentration.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. The present invention is not intended to be limited to the embodiments shown, but is to be accorded the widest possible scope consistent with the principles and features disclosed herein.

The practicality of using a BES in the field often relies heavily on the system configuration (Lu, et al., J. Hazardous Mat. (2014) 274:8-15). The present application demonstrates that a column-style configuration of BES can substantially enhance total petroleum hydrocarbon (TPH) biodegradation up to at least about 241% of that from the baseline biodegradation. For example, in a 120-day experimental period, 82.1-89.7% of TPH was degraded. Moreover, the enhanced biodegradation was observed well beyond the area immediately adjacent to the BES electrode. This finding demonstrates the capabilities of the inventive BES configuration in actual field applications to enhance biodegradation of petroleum contaminated soils. This passive remedial technology can shorten remediation time and generate considerable savings. The electrical current generated by the BES during the biodegradation may be used as an indicator for hydrocarbon degradation as well as a power source for remote sensors.

Biodegradation rates obtained here from a scalable pilot reactor were comparable or higher than that from previous lab-scale studies, suggesting the configuration can be scaled up without sacrificing performance. For example, compared with a previous lab-scale study using 1.5 L soil and 1.5 cm ROB (Yuan, et al., J. Soils Sediments (2010) 10:1427-1433), the presently exemplified 50 L reactor with 7.5 cm ROB unexpectedly produced much significantly higher power (8.8 $mW/m^2$ vs. 0.85 $mW/m^2$). Advantageously, the TPH removal was 65.5-78.6% throughout the 50 L pilot reactor verses 15.2% TPH removal adjacent to the anode surface in the 1.5 L lab-scale reactor during the same 25 day period. The BES electrode influence on microbial activity in soils often mainly relies on the anode material, which ideally maximizes reactive surface area for highly efficient collection of electron from the microbial degradative processes. Granulated graphite and biochar performed similarly well in enhancing TPH biodegradation, demonstrating the suitability of both materials as anodes. The relatively low material cost and ease of application add to the practicality of the column-type BES configuration for soil remediation. The present findings demonstrate that biochar has high potential as a BES anode material for remediation applications.

The electric current profiles for the BESs indicate its correlation with hydrocarbon biodegradation. In the present application, the increase and plateau in BES electrical current generation are indicative of increased and stable microbial viability in degrading diesel compounds; while the decrease of current represents both depletion of more bioavailable constituents and the presence of more recalcitrant compounds (if indicated so by the remaining TPH). The profile of the electric current in a BES as described herein could be used to remotely monitor the progress of biodegradation, reducing or eliminating field soil sampling frequency.

The field application of a BES would in many cases depend greatly on its effective ROI. The present application demonstrates that the ROI for the column-configured BES is feasible to implement for field enhancement of petroleum compound biodegradation. Data also suggest that the effective ROI of the BES can further extend with time. In field application, each BES module is a hub with the highest biodegradation activities, and its area of coverage determines the spacing and distribution of the BES for remediation in a larger area. The ROIs maybe affected by soil water content, matrix permeability and porosity, and the characteristics of the constituents of concern. While a BES in a water-saturated matrix with higher permeability will usually have the largest ROI, the results presented here show that surprisingly the presently described BES has utility in a variety of soil types and over a range of water contents.

As used herein, "Biochar" refers to a carbon rich material created by pyrolysis of biomass.

As used herein, "vadose zone" refers to the zone that extends from approximately the top of the ground surface to at or near the water table. In general terms, the vadose zone consists of soil that is unsaturated by water and is therefore less conductive that soil that is water-saturated.

As used herein, "unsaturated soil" refers to soil whose pores are not filled with water. Soil may be referred to as being "X % unsaturated," wherein X is a numerical value, when a percentage of the pores are not filled with water.

As used herein, the "radius of influence" refers to the distance from the anode where biodegradation of contaminants in the soil continues to be enhanced by the transfer of electrons between the anode and the cathode of the BES column. The ROI may or may not be circular in nature around the BES column and may be irregular in shape/distance, influenced by factors including, but not limited to, the shape of the BES column, differences in soil composition in different areas surrounding the BES column, and/or differences in percent saturation of the soil in different areas surrounding the BES column. In some embodiments, the ROI remains static. In other embodiments, the ROI changes with the passage of time. In still other embodiments, the ROI increases with the passage of time until a maximal distance is reached, followed by the ROI remaining static. In yet other embodiments, the ROI increases with the passage of time until a maximal distance is reached, followed by a decrease in the ROI associated with the depletion of metabolizable contaminants in the soil. In even other embodiments, the ROI fluctuates in response to changes in the percent saturation of the soil.

The present application provides a bioelectrochemical system (BES) for the remediation of a substrate comprising at least one contaminant, comprising: at least one BES column comprising a central tube having one end open to the an oxygen-containing gaseous environment and a perforated opposite end configured for submersion into substrate, wherein the portion of said tube that is submerged into said substrate is perforated; a cathode layer external to said central tube and encasing at least a portion of the perforated portion of said central tube; a separator layer external to said cathode layer, wherein said separator layer isolates, e.g, physically isolates, said cathode layer from said substrate; an anode layer external to said separator layer, wherein said separator layer isolates e.g, physically isolates, said anode layer from said cathode layer; a containment layer external to said anode layer; and an electrical current interface functionally connecting said anode layer to said cathode layer.

The shape, size, and construction of the BES column is not particularly critical and may vary depending upon the contaminates, substrate, and other components. Therefore, a useful BES column typically includes cylinders, as well as, cylindrical-like materials with cross-sections that are not necessarily circular. Instead, cross-sections may be square, rectangular or other shapes. In a preferred embodiment, a column is substantially cylindrical.

Similarly, the size, shape, and material of said central tube is not particularly critical so long as it is open to oxygen-containing gaseous environment and comprises a perforated opposite end configured for submersion into a desired substrate. Suitable tubes may be circular, square, rectangular or some different cross-section. In some embodiments, said central tube is composed of a polymer material. In other embodiments, the end of the central tube opposite said end open to the an oxygen-containing gaseous environment is capped. In still other embodiments, said central tube has an inner diameter, i.e., longest cross-section dimension, of about 9 cm. In yet other embodiments, said central tube has an inner or outer diameter of at least about 5, 6, 7, 8, 9, 10, 11, 12, 13, 14, 15, 16, 17, 18, 19, 20, 25, 30, 40, 50, 60, 70, 80, 90, 100, 150, 200, 250, 300, 400, 500, 600, 700, 800, 900 or 1000 cm. In particular embodiments, the longest cross-section dimension of the BES column is between about 5 cm and 30 cm. In more particular embodiments, the longest cross-section dimension of the BES column is between about 10 cm and 20 cm.

The BES column is embedded into the soil to any convenient effective depth and such depths may vary depending upon the system, contaminates, soil, etc. In particular embodiments, the BES column is embedded at least 0.5 meters, or at least about 1 meter, or at least about 1.5 meters into the soil.

In some embodiments, said cathode layer is a mesh-like material. In particular embodiments, said cathode layer comprises a conductive material selected from a group including, but not limited to, stainless steel, graphene, silver, copper, gold, aluminum, calcium, tungsten, zinc, nickel, lithium, iron, platinum, tin, carbon steel, lead, titanium, manganin, constantan, mercury, nichrome, nitinol, and mixtures thereof.

In other embodiments, said cathode layer further comprises a catalyst layer facing said separator layer. In further embodiments, said catalyst layer comprises platinum. In still further embodiments, the catalyst layer comprises carbon supported platinum nanoparticles (Pt/C). In even further embodiments, the Pt/C is in the form of nanoparticles. In other further embodiments, said catalyst layer comprises cobalt. In still further embodiments, the catalyst layer comprises carbon supported cobalt (Co/C). In even further embodiments, the Co/C is in the form of nanoparticles. In still other further embodiments, the catalyst layer comprises, in some form, both Pt and Co.

In some embodiments, said separator layer is substantially waterproof. In some further embodiments, said separator layer comprises glass or glass fiber. In other further embodiments, said separator layer comprises a polymer material. In further embodiments, the polymer material comprises a material selected from the group consisting of polymethyl methacrylate (PMMA), polytetrafluoroethylene (PTFE) and polyethylene terephthalate (PET).

In particular embodiments, said anode layer comprises a particulate material. In further embodiments, the particles have a size between about 10 $mm^3$ and about 1000 $mm^3$. In still further embodiments, the particles have a size between a lower size selected from the group consisting of at least about 15, 20, 25, 30, 35, 40, 45, 50, 60, 70, 80, 90 and 100 $mm^3$ and an upper size selected from the group consisting of at most about 50, 60, 70, 74, 80, 90, 100, 150, 200, 300, 400, 450, 500, 600, 700, 800 and 900 $mm^3$. In even still further embodiments the particles have an average size of about 10, 15, 20, 25, 30, 35, 40, 45, 50, 60, 70, 74, 80, 90, 100, 150, 200, 300, 400, 450, 500, 600, 700, 800, 900 and 1000 $mm^3$.

In particular embodiments, said anode layer comprises particles having an average surface area of about 50 $mm^2$ to about 400 $mm^2$ per particle. In other embodiments, said anode layer comprises particles having an average surface area of about 74 $mm^2$ to about 85 $mm^2$ per particle. In still other embodiments, said anode layer comprises particles having an average surface area of about 65 $mm^2$ to about 284 $mm^2$ per particle.

In other particular embodiments, said anode layer comprises a material selected from particulate biochar and graphite granules. In further embodiments, the biochar has a particle size of from about 60 to about 74 $mm^3$. In other further embodiments, the graphite granules have a particle size of from about 50 to about 450 $mm^3$. In some embodiments, said anode material includes, but is not limited to, biochar, charcoal, graphite, carbon paper, carbon cloth, graphite fiber, activated carbon and biofilm.

In some embodiments, said anode layer is about 3 cm thick, as measured from the separator layer outward. In further embodiments, the anode layer is about 1, 2, 4, 5, 6,7, 8, 9, 10, 15, 20, 25, 30, 40, 50, 60, 70, 80, 90, 100 cm thick. In other further embodiments, the thickness of the anode layer, as measured from the separator layer outward, is at least about 10, 15, 20, 25, 30, 33, 35, 40, 45, or 50 percent of the outer diameter of the central tube.

In some embodiments, said containment layer is a mesh material. In further embodiments, the mesh comprises a polymer material. In still further embodiments, the polymer material is selected from the group consisting of nylon, PMMA, PTFE and PET.

In particular embodiments, said electrical current interface functionally connecting said anode layer to said cathode layer comprises a conductive wire, conductive ribbon, or both. In some further embodiments the electrical current interface further comprises a graphite rod in contact with the anode layer. In other further embodiments, said electrical current interface is connected to at least one device for monitoring remediation of said substrate. In still further embodiments, said bioelectrochemical system generates a sufficient amount of electrical current to power said device without requiring the input of energy from other power sources. In other further embodiments, said bioelectrochemical system generates more electrical current than what is required to power said device. In some embodiments, said at least one BES column generates at least about 70 $mA/m^2$ electricity.

In some embodiments, said BES column has a radius of influence (ROI) for hydrocarbon degradation that is at least 5 times the radius of the column. In further embodiments, the ROI is at least 6, 7, 8, 9,10, 11, 12, 13, 14, 15, 20 or 25 times the radius of the column. As stated above, in some embodiments, the ROI is a function of time. The ROI can be measured at any time point after the emplacement and/or activation (i.e., completing the circuit between the anode and the cathode) of the BES column. By way of non-limiting example, the ROI can be measured at about 5, 10, 15, 20, 25, 30, 35, 40, 45, 50, 55 minutes; 1, 2, 3, 4, 5, 6, 7, 8, 9, 10, 12, 18, 24, 36, 48, 60 hours; 1, 2, 3, 4, 5, 6, 7, 10, 14, 21, 28, 35, 42 days; 1, 2, 3, 4, 5, 10, 15, 20 weeks; 1, 2, 3, 4, 5, 6, 7, 8, 9, 10, 12, 18 months; and/or 1, 2, 3, 4, 5, 6, 7, 8, 9, 10, 15, 20 years after emplacement and/or activation of the BES. In some embodiments, the ROI is at least 11 times the radius of the column at 45 days after activation of the BES column.

One aspect of the present application relates to a method for the remediation of a substrate comprising at least one contaminant, comprising: contacting said substrate with a bioelectrochemical system (BES) as described above and operating the BES until suitable remediation, e.g., contaminant reduction has occurred.

In some embodiments, said at least one contaminant comprises at least one petroleum hydrocarbon compound. In other embodiments, said at least one contaminant is selected from the group consisting of petroleum, crude oil, diesel fuel, gasoline, kerosene, aviation fuel, motor oil, heating oil, propane, polyethylene glycol, ammonia, sulfide, agricultural waste and biofuel.

In some embodiments, an array of more than one BES columns is installed at a site designated for remediation. In further embodiments, said BES columns are embedded in said site designated for remediation at a distance from one another such that their predicted ROI at a target time point will meet or overlap one another in order to achieve a targeted suitable level of remediation, wherein said predicted ROI is based upon factors including, but not limited to, soil composition, saturation level of the soil, amount of contaminant in the soil and nutrients present in the substrate. In some embodiments, the BES columns are submerged in holes newly excavated into the substrate. In other embodiments, the BES columns are submerged into existing holes in the substrate. In further embodiments, said existing holes are previously existing monitoring wells. In other further embodiments, said existing holes are bores from abandoned oil or gas wells.

In particular embodiments, said substrate is unsaturated soil. In further embodiments, said soil is less than about 90% saturated. In still further embodiments, said soil is less than about 80, 70, 60, 50, 45, 40, 35, 30, 25, 20, 15, 10 or 5% saturated.

In other particular embodiments, said substrate is vadose zone.

The systems disclosed herein are applicable to a variety of substrates, i.e., soil types. Typically, the systems disclosed are more efficient or perform more rapidly with increasing amounts of moisture in the substrate. Therefore, soil types that tend to hold more moisture may be more preferable in some cases. Therefore, in some embodiments, said substrate may comprise at least 15% loam, and/or at least 15% sand, and/or at least 15% silt, and/or at least 15% clay.

In some embodiments, the method further comprises augmenting said substrate with at least one microbial species. In some further embodiments, said at least one microbial species is selected from the group of genera consisting of *Achromobacter, Actinomyces, Alcaligenes, Anaerovorax, Azospirillum, Bacillus, Bordetella, Clostridium, Comamonas, Enterobacter, Fulvimonas, Gemmatimonas, Gordonia, Gp1, Gp3, Gp4, Gp6, Gp16, Ilumatobacter, Meniscus, Mycobacterium, Nocardioides, Ochrobactrum, Olivibacter, Ohtaekwangia, Parvibaculum, Pseudomonas, Pseudoxanthomonas, Pusillimonas, Sedimentibacter, Shinella, Skermanella, Sphingobium, Sporomusa, Stenotrophomonas,* TM7_Genera_Incertae_Sedis, *Williamsia,* and mixtures thereof. In other embodiments, the method further comprises augmenting the soil with at least one nutrient compound.

Another aspect of the present application relates to a method for the generation of electricity via bioelectrochemical reaction, comprising: contacting a substrate comprising at least one contaminant with a bioelectrochemical system comprising: at least one BES column comprising a central tube having one end open to the an oxygen-containing gaseous environment and a perforated opposite end configured for submersion into substrate; a cathode layer external to said central tube configured for encasing at least a portion of the perforated portion of said central tube; a separator layer external to said cathode layer, wherein said separator layer isolates said cathode layer from substrate; an anode layer external to said separator layer, wherein said separator layer isolates said anode layer from said cathode layer; a containment layer external to said anode layer; and an electrical current interface functionally connecting said anode layer to said cathode layer; and operating said system to generate electricity.

In some embodiments, said at least one contaminant comprises at least one petroleum hydrocarbon compound.

In other embodiments, said at least one contaminant is selected from the group consisting of petroleum, crude oil, diesel fuel, gasoline, kerosene, aviation fuel, motor oil, heating oil, propane, ammonia, polyethylene glycol, sulfide, agricultural waste and biofuel.

In particular embodiments, the method further comprises storing said electricity.

In some embodiments, said substrate is unsaturated soil.

In other embodiments, said at least one BES column comprises a ROI at least 11 times the radius of the column at 45 days.

In particular embodiments, said at least one BES column comprises an array of BES columns. In further embodiments, the BES Columns in said array are linked for collection of electricity.

In some embodiments, said at least one BES column generates at least about 70 $mA/m^2$ electricity.

In other embodiments, the method further comprises augmenting said substrate with at least one microbial species selected from the group of genera consisting of *Achromobacter, Actinomyces, Alcaligenes, Anaerovorax, Azospirillum, Bacillus, Bordetella, Clostridium, Comamonas, Enterobacter, Fulvimonas, Gemmatimonas, Gordonia,* Gp1, Gp3, Gp4, Gp6, Gp 16, *Ilumatobacter, Meniscus, Mycobacterium, Nocardioides, Ochrobactrum, Olivibacter, Ohtaekwangia, Parvibaculum, Pseudomonas, Pseudoxanthomonas, Pusillimonas, Sedimentibacter, Shinella, Skermanella, Sphingobium, Sporomusa, Stenotrophomonas,* TM7_Genera_Incertae_Sedis, *Williamsia,* and mixtures thereof.

The present invention is further illustrated by the following example which should not be construed as limiting. The contents of all references, patents and published patent applications cited throughout this application, as well as the Figures and Tables, are incorporated herein by reference.

EXAMPLE 1

Demonstration of a Scalable Bes Electrode System

Soil Collection and Preparation

Sandy loam soil from a diesel fuel storage tank (having a TPH concentration of 3.5 g TPH/kg dry soil (DS)) impacted area was collected near Lincoln, Nebr., USA. The soil sample was taken from 5 to 10 cm below ground surface, sealed, and transported to the laboratory overnight. The soil was sieved to <2 mm (diameter) after being partially air-dried. The soil was spiked with #0 diesel to a target concentration of approximately 8 g TPH/kg dry soil (DS), and incubated for two months at a temperature of 22±2° C. to enrich indigenous hydrocarbon-degrading microorganisms. No external microbial inoculation was introduced. Before adding to the reactor, the soil was saturated with deionized water (42.6±0.6% water content), spiked with diesel, and manually homogenized to a TPH concentration of 12.25±0.36 g TPH/kg-DS. Aliquots of soil were used for baseline characterization, as summarized in Table 1.

TABLE 1

Baseline characterization of the raw diesel contaminated soil.

| Parameter | Value |
|---|---|
| pH | 6.71 ± 0.03 |
| Conductivity (mS/cm) | 3.09 ± 0.06 |
| Bulk density (g/cm$^3$) | 1.41 ± 0.02 |
| % Sand | 61.83 ± 0.50 |
| % Silt | 20.62 ± 0.32 |
| % Clay | 17.55 ± 0.68 |
| Total organic carbon (g/kg - DS) | 22.64 ± 1.56 |
| Total organic mass (g/kg - DS) | 36.09 ± 0.29 |
| Total petroleum hydrocarbons (g/kg - DS) | 12.25 ± 0.36 |
| Sum of $C_8$-$C_{25}$ n-alkanes (mg/kg - DS) | 1777 ± 15 |
| Nitrate (mg/kg - DS) | 7.77 ± 1.3 |
| Phosphate (mg/kg - DS) | 63.00 ± 2.00 |
| Sulfate (mg/kg - DS) | 25.89 ± 0.67 |

DS: Dry soil.

Column-type BES and Soil Experimental System Construction and Operation

Figure 1A:
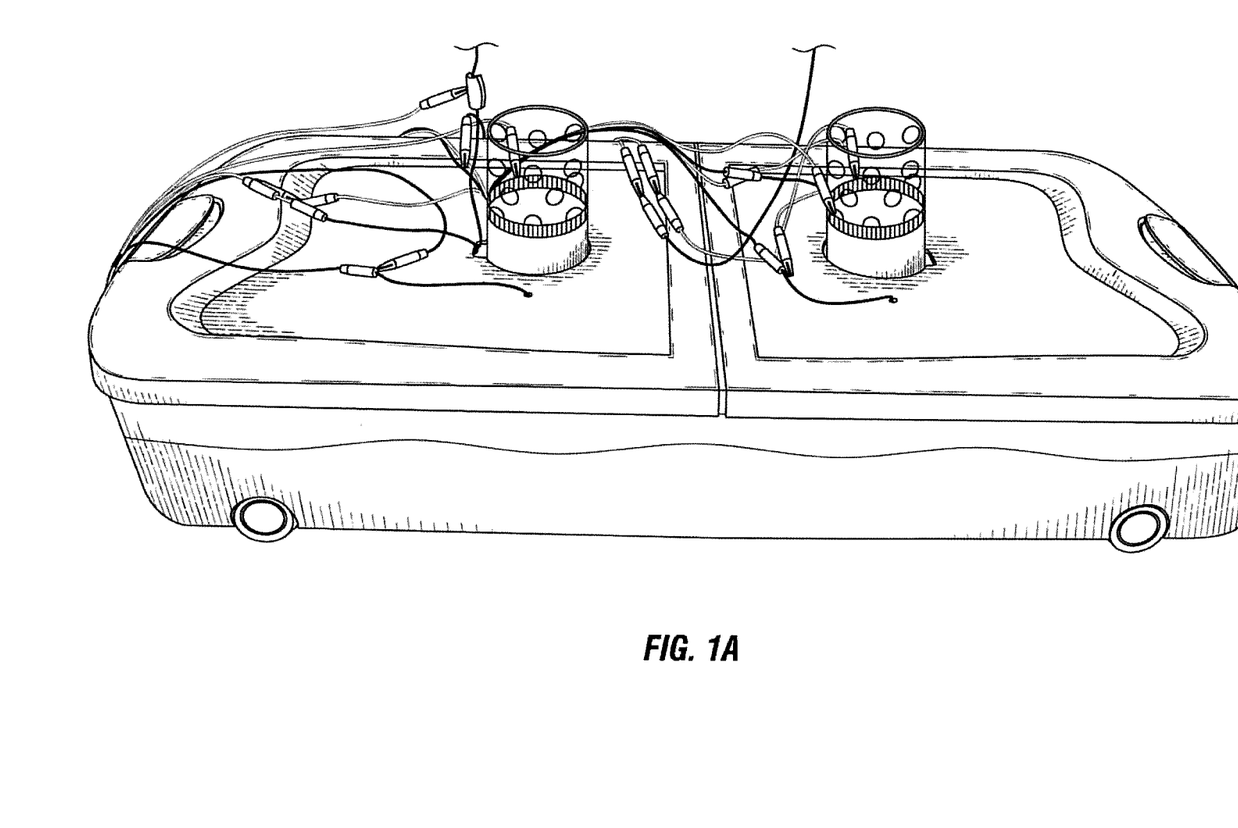
FIG. 1 is a schematic representation of an exemplary column-type BES design.
Figure 1B:
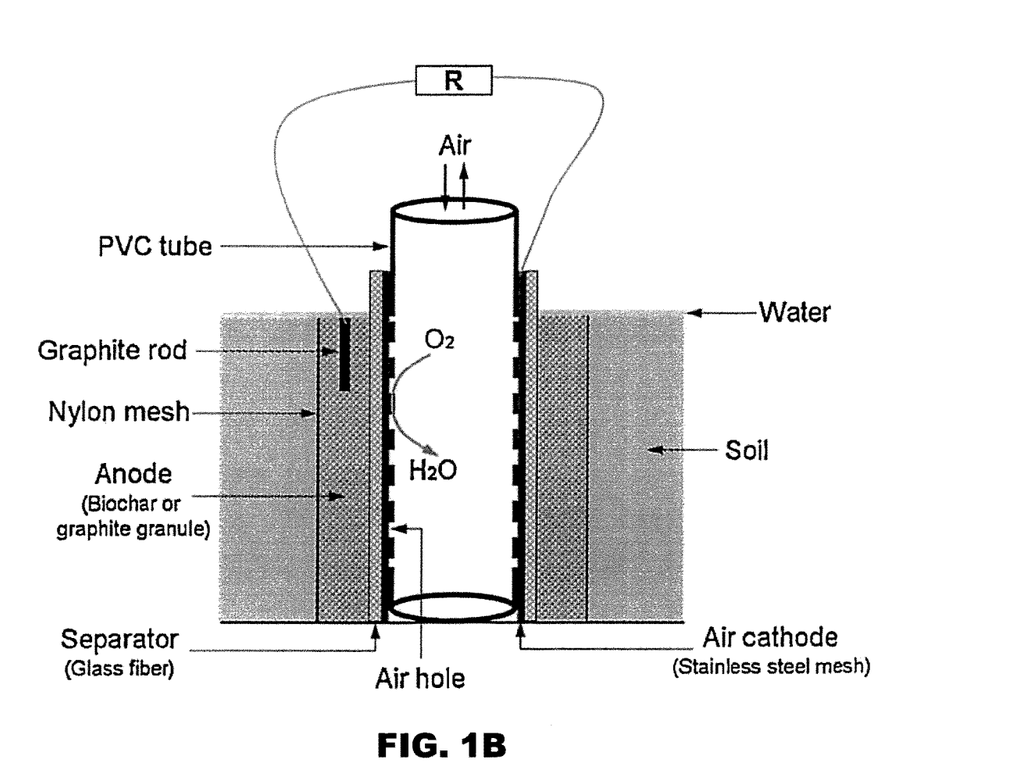

The experimental system consisted of a rectangular polypropylene storage container with the dimensions 100×50×17 cm (length×width×height) and was filled with the diesel-impacted soil to a total soil volume of 50 L (FIG. 1A). Two column-type BESs were constructed as shown in FIG. 1B, with one BES containing a graphite granule anode (GGA) and the other a biochar anode (BCA). The air cathode consisted of stainless steel mesh (30×15 cm, type 304 stainless steel) with a platinum/carbon catalyst layer (0.1 mg Pt/cm$^2$, effective cathode projected area of 168 cm$^2$) on one side and two poly(dimethylsiloxane) (PDMS) waterproof layers on the other side. With the catalyst side facing the anode, the cathode was wrapped around a porous polymethyl methacrylate (PMMA) tube (23 cm×9 cm OD) with holes (1.5 cm dia.) distributed evenly along the length of 10 cm, and one end of the tube was sealed with a rubber cap. The cathode was covered by two layers of glass fiber (0.24 mm thick), which served as a separator to prevent short circuit. A closed barrier was fabricated using nylon mesh (50 cm×12 cm) and wrapped around the tube to form a 3 -cm thick space, where 1360 cm$^3$ anode materials were packed. The anode materials consisted of biochar (60-74 mm$^3$ particle size, 428.55 cm$^2$/g surface area, 37.64 Å average pore diameter, and 0.012 Ωm resistivity (Huggins, et al., Biresour. Technol. (2014) 157:114-119)) or graphite granule (50-450 mm$^3$ particle size, 0.44 cm$^2$/g surface area, 71.0 Å average pore diameter, and 9×10$^{-6}$ Ωm resistivity (Wang, et al., J. Power Sources (2011) 196:5863-5866)). A graphite rod (10 cm×1.2 cm OD)was inserted into the bed of granules and connected to the external circuit by a titanium wire. Anodes and cathodes were connected to 100Ω external resistors.

Figure 2:
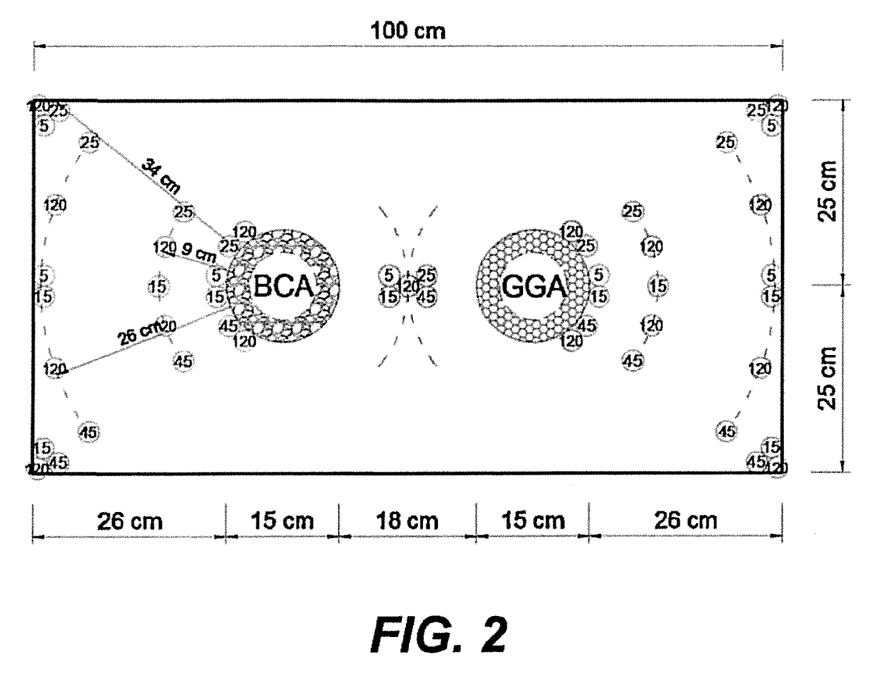
FIG. 2 shows an exemplary BES soil remediation experiment schematic with sampling locations (numbers in circles indicate the sampling day).

The two BESs were installed into the soil as shown in FIG. 2, and the top of the container was covered with a hollow polypropylene lid to minimize loss of water and hydrocarbon from evaporation. The BESs operated for 120 days at a temperature of 22±2° C. Soil samples were collected from points as indicated in FIG. 2, where each sample was a composite of the soil from top to bottom and mixed before analysis. The soil samples were analyzed for TPH and n-alkanes. As used herein, the "radius of influence" ("ROI") of each BES module is defined as the distance between the outer surface of the BES anode to the location where TPH concentrations are lower than that in the baseline control. The furthest distance is the maximum ROI, where TPH concentrations should be equivalent to that in the control. Influence of both BESs on the TPH degradation was evaluated by measuring the soils in the middle of the two modules. Each BES was connected to a data logger to measure the electrical potential across the resistors. Same soil containing no BES in a covered container served as the control, which reflected baseline natural attenuation.

Analytical Methods

Total petroleum hydrocarbon (TPH) of soil samples was characterized using modified United States EPA Method 8015D (2003) and Massachusetts Department of Environmental Protection EPH (Method for the Determination of Extractable Petroleum Hydrocarbons (EPH), 2004). Briefly, 5 g of the soil sample was blended with moderate anhydrous $Na_2SO_4$ to remove moisture. Then, the extraction was carried out by mixing the soil with 10 mL dichloromethane using vortex for 5 min and sonication for 5 min. The slurry was centrifuged at 8000×g for 5 min, and the supernatant was collected. This procedure was repeated, and the two extracts were combined and dehydrated using anhydrous $Na_2SO_4$. After being concentrated to 1 mL under nitrogen, the total concentrated extract was cleaned with silica gel to remove polar components. TPH was measured by using a Thermo TRACE GC Ultra Gas Chromatograph equipped with a Restek Rxi-1 ms column (20 m×0.18 mm ID, 0.18 Ωm film thickness), split injector, and flame ionization detector. Aliphatic hydrocarbon calibration standards were prepared by diluting a n-alkane standard mixture ($C_8$-$C_{40}$, Sigma-Aldrich Co. Ltd.) at five concentrations. Calibration factor (CF) is the ratio of GC peak area response to the mass of injected analyte. Total petroleum hydrocarbon (TPH) was defined as the collective concentrations of all hydrocarbon compounds eluting from n-nonane ($C_9$) to n-hexatriacontane ($C_{36}$) and was calculated using a collective CF of all component standards in that fraction ($C_9$-$C_{36}$ n-alkane, 28 compounds) at different calibration standard concentrations.

Soil analytical results in this example are reported on a dry-weight basis. The pH and conductivity of soil were measured in a 1:5 (w/v) soil:deionized water mixture. Soil particle-size distribution was evaluated using the method described by Kettler, et al. (Soil Sci. Soc. Am. J. (2001) 65:849-852). The soil organic carbon (SOC) was determined by following the Walkley-Black procedure (Walkley, et al., Soil Sci. (1934) 37:29-38) and soil organic matter (SOM) based on the mass loss on ignition (Bianchi, et al., Braz. Arch. Biol. Technol. (2008) 51:263-269). Available nitrate, phosphate, and sulfate in soil were extracted as described by Mussa et al. (Int. J. PharmTech Res. (2009) 1:598-604) and were determined according to standard methods (American Public Health Association, (APHA), American Water Works Association, and Water Environment Federation, Standard Methods for the Examination of Water and Wastewater, 20th ed., American Public Health Association, Washington, D.C., 1998). All chemical analyses were conducted in triplicate and results were averaged.

Voltage (E) across the external resistor (R=100Ω) was recorded every 10 min. by using a data acquisition system (model 2700, Keithley, Inc.). Current (I) was calculated by Ohm's law (I=E/R). Power density curves as a function of current density were obtained by varying the external resistor from 10 to 1000Ω. Current and power density were normalized to the effective cathode projected area (168 cm$^2$). Electrochemical impedance spectroscopy (EIS) (10$^5$ to 0.01 Hz frequency range and 10 mV amplitude) was used to determine the system internal resistance (Luo, et al., Bioresour. Technol. (2012) 120:187-193; Du, et al., Pet. Sci. (2011) 8:502-514).

Results

Baseline Soil Characterization

The soil characterization results are summarized in Table 1, above. The soil was determined to be sandy loam (based on the sand-silt-clay fractions), slightly saline (based on electrical conductivity), and within a circum-neutral pH range of 6.5-8.0. Organic matter other than petroleum hydrocarbons was present in the soil, most likely as humic compounds. The starting TPH concentration of the soil for the BES experiments was determined to be 12.25 g/kg (~1.23%).

Electrical Current Production from BESs

Figure 3:
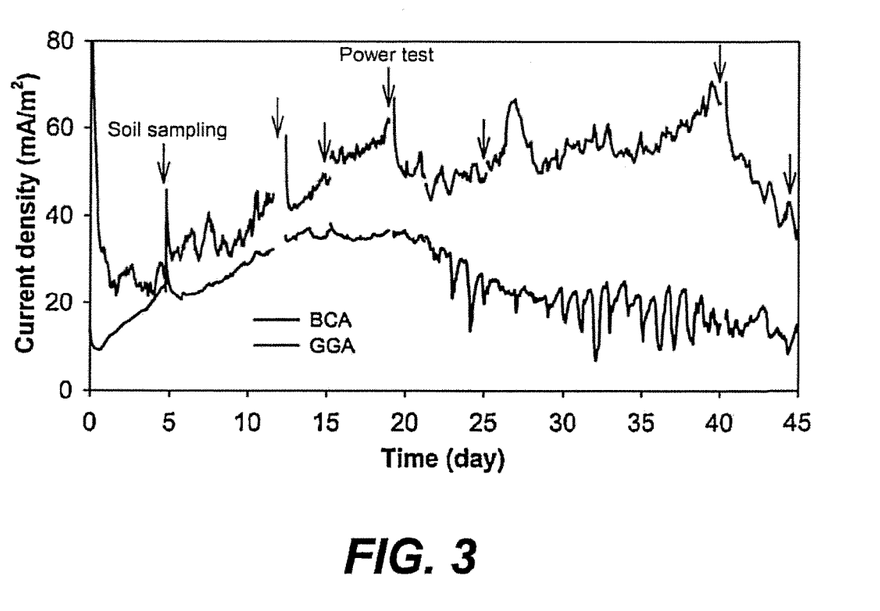
FIG. 3 illustrates the current densities of BESs containing biochar anode (BCA) and granular graphite anode (GGA) electrodes. Blue and green arrows indicate the points for soil sampling and power density test, respectively.

Current generation was observed from both BESs that used either biochar anode (BCA) or graphite granule anode (GGA) (FIG. 3). After an initial lag phase, the profiles of current output showed qualitative correlations with hydrocarbon degradation. The current increased gradually due to microbial acclimation and increased electrochemical activities, and the small current fluctuation during the operational period reflected the heterogeneous nature of the hydrocarbon compounds and uneven mass transfer within the contaminated soil. The BCA electrode module reached a maximum current density of 35.2±0.8 mA/m2 (maximum power density of 3.4±0.1 mW/m2) between 12 and 21 days, and then the current showed a slow decreasing trend. The current generation by the GGA electrode module continued to increase, though with fluctuation, until day 39-40, with a maximum produced current of 70.4±0.2 mA/m2 (maximum power density of 8.8±0.3 mW/m2). After that the current dropped rapidly, which was a typical profile in MFCs when substrates became limited. The relative low current production from the electrode module using BCA was believed to associate with the higher internal resistance of 25.6±0.2Ω as compared to 11.1±0.3Ω in the GGA electrode module.

Petroleum Hydrocarbon Degradation and ROI Determination

Figure 4:
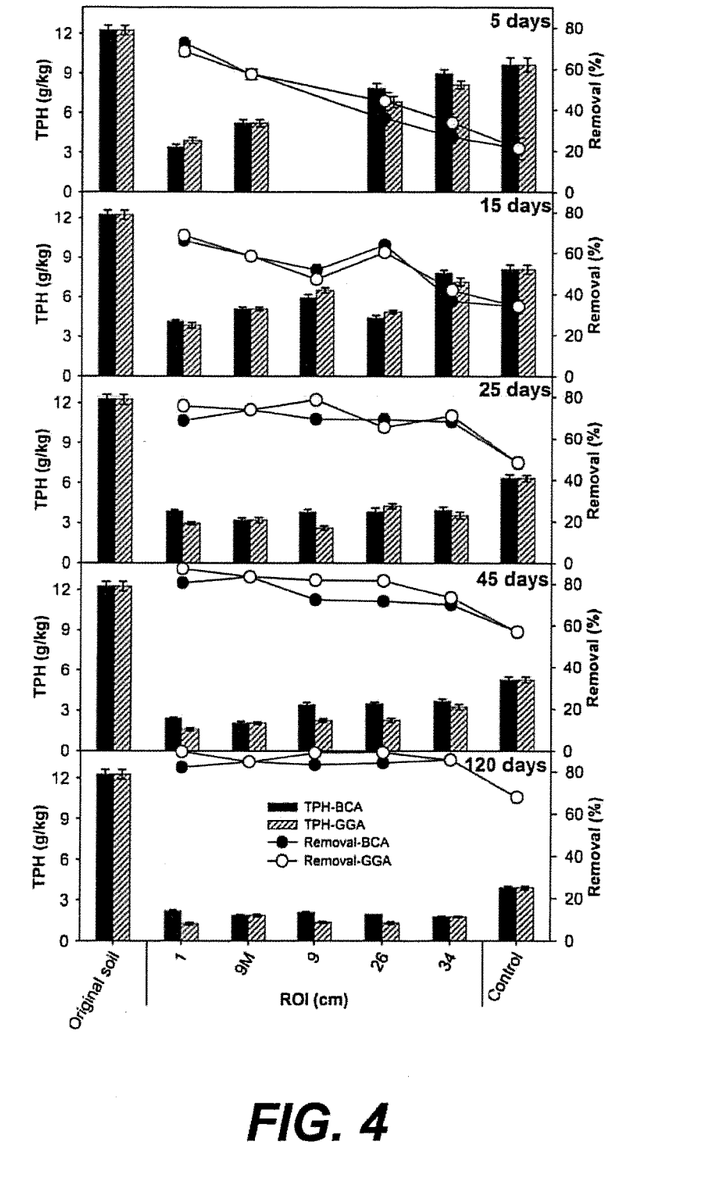
FIG. 4 depicts the total petroleum hydrocarbon (TPH) removal from the BES-reactor and base-line control at different ROI and sampling times. "M" indicates the middle point of the two BESs.

The spatial and temporal distribution of total petroleum hydro-carbon (TPH) degradation during the BESs operation can be found in FIGS. 4 and 5A-B. The TPH degradation at different distances (1, 9, 26 and 34 cm) from each BES assembly was monitored on day 5, 15, 25,45, and day 120. The specific sampling locations are marked in FIG. 2. Total petroleum hydrocarbon (TPH) concentrations on day 5 at 1 cm from the electrode out surface dropped by 72.4% and 68.2% for BESs containing BCA and GGA, respectively (FIG. 4). This is an up to 241% increase in degradation efficiency when compared to control, in which 21.2% TPH was removed. The immediate decrease of TPH near the BESs upon the system installation was mainly attributed to absorption by the anodes. The TPH degradation rates appeared to decline with the distance extended from the anodes (36.0-44.3% at 26 cm, and 26.7-33.7% at 34 cm). As shown by the black line in FIG. 5A and B, the slope between the ROI and enhanced TPH removal (by deducting the baseline TPH removal in the controls) is steep, indicating a smaller radius of influence.

On day 15, the TPH degradation rate at a radius of 26 cm increased significantly to 64.0% for the BCA-BES, 60.3% for the GGA-BES, indicating an increase of 36-78% since day 5. There was also a 24-36% increase at the radius of 34 cm from day 5 to day 15. This was reflected the by the decreasing slope in FIG. 5. The extension of the ROI indicated that the removal of TPH closer to the electrodes created a concentration gradient that drove the mass transfer toward the electrode, resulting in further increase of the ROI. This hypothesis was supported by the continuous increase in current production from the electrode circuits. At 9 cm from the electrodes, soil influenced by both BES assemblies had more TPH removal (58.4%, in the middle of two modules) than that influenced by only one assembly (46.9-51.6%), suggesting a combined effect from the two BESs in enhancing TPH degradation. Similar to the observation on day 5, the control had significantly lower TPH degradation of 34.0%.

On day 25, 45 and up to day 120, the extension of the ROI continued, though at a slower pace. The TPH removal continued to increase along with the operation, especially for locations further away from the BES assemblies. On day 25, the TPH removals in soils at different ROIs ranged from 65.5% to 78.6%, as compared to 48.3% in the control. On day 45, TPH removals across the reactor increased to 70.0-87.2% (V.S. 57.0% in control) and the current of both BESs dropped to a low level, suggesting that hydrocarbon substrates became limited due to the biodegradation. On day 120, 82.1-89.7% (V.S. 67.9% in control) of TPH had been removed across the whole reactor, and the soil TPH fraction was approximately the same for all BESs radial distances from the anodes. The small amount of TPH remaining in soil was likely those recalcitrant hydrocarbon fractions, such as those with higher affinity to soil particles. The analyses of TPH contents adsorbed on the anodes of both BESs showed that hydrocarbon residues were <14% of TPH in soils close to these anodes at the end of test, suggesting that the majority of contaminants were degraded by the respiration of anode microbes other than abiotic adsorption.

Figure 5:
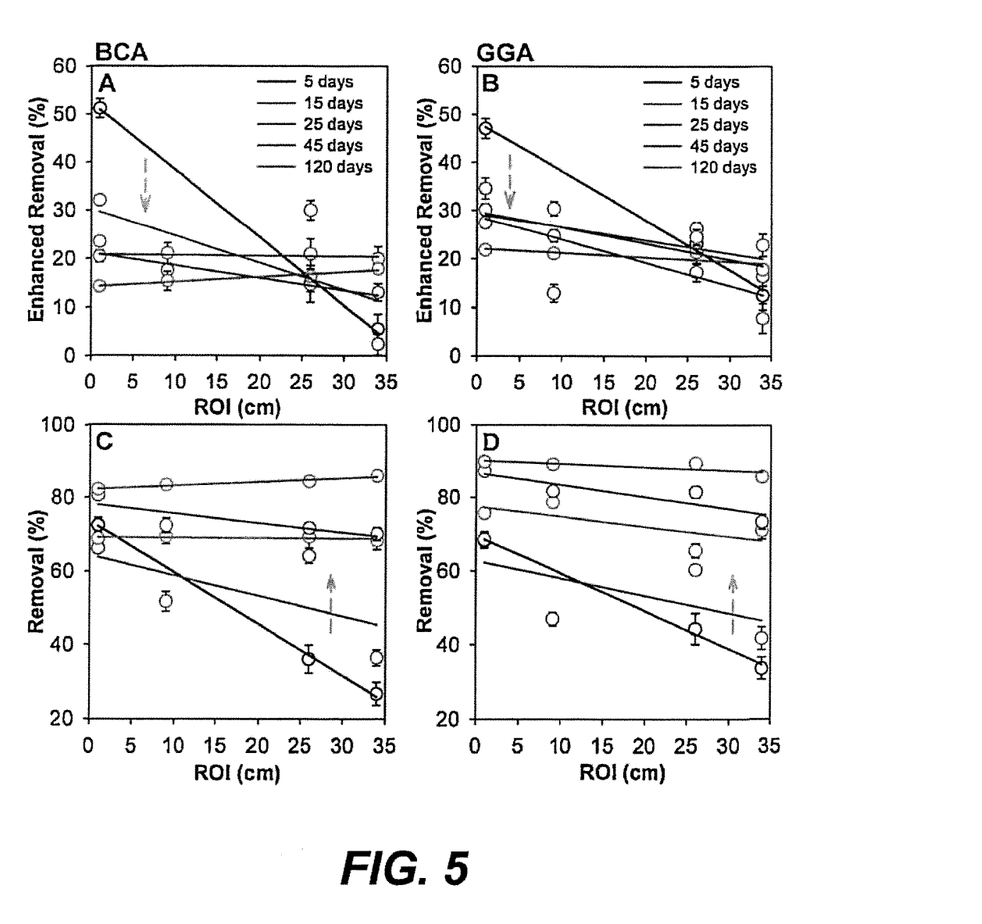
FIGS. 5A-D shows the relationship between TPH removal and the radial distance from the BES anodes at different sampling times.

A negative linear correlation between the amount of TPH degradation and the radial distance from the BES anodes was observed, and the slope of the correlation became less negative with time (FIG. 5). Table 2 lists the equations derived from the data of each BES from day 5 to day 120. A linear regression simulation between enhanced TPH removal (Y axis) and ROI (X axis) can be used to visually describe the expansion of ROIs with time in this saturated soil condition. FIG. 5 clearly shows that the slope of the ROI gradually flattened during the experiment, indicating a continued extension of the ROI. The interception with X-axis can be regarded as the predicted maximum ROI of the BESs. For example, from day 5 today 45, the projected maximum ROI increased from 37-47 cm to 81-90 cm. The maximum ROI can be further projected to expand after 120 days (FIGS. 5A and B). Moreover, Table 2 shows that such correlation is statistically significant, with correlation coefficients between 0.8396 and 0.9992. Additionally, the ratios of the maximum ROI to radius of BES (ROB) are 11 and 12 for BCA and GGA, respectively. This ROI/ROB ratio can be important when electrode size and spacing are calculated in large-scale applications. Also, this ROI only reflects the BES enhancement on TPH degradation that exceeds that of the baseline natural attenuation. If the ROI was calculated based on the combined influence of both BES and baseline attenuation in the reactor, it would have extended to 260-300 cm after 45 days (FIGS. 5C and D).

TABLE 2

Predicted maximum ROI for soil remediation BESs.

| Electrode module | Linear fit equation | Maximum ROI (cm) | ROI/ROB |
|---|---|---|---|
| | | 5 Days | |
| BCA | y = 52.32 − 1.40x, R = 0.9992 | 37 | 5 |
| GGA | y = 48.38 − 1.03x, R = 0.9975 | 47 | 6 |
| | | 45 Days | |
| BCA | y = 21.12 − 0.26x, R = 0.8396 | 81 | 11 |
| GGA | y = 29.74 − 0.33x, R = 0.8884 | 90 | 12 | y: TPH removal.
x: ROI.
Maximum ROI is the x value when y is equal to zero.
ROB: radius of BES (7.5 cm in this study).

Biodegradation of n-alkanes

Figure 6:
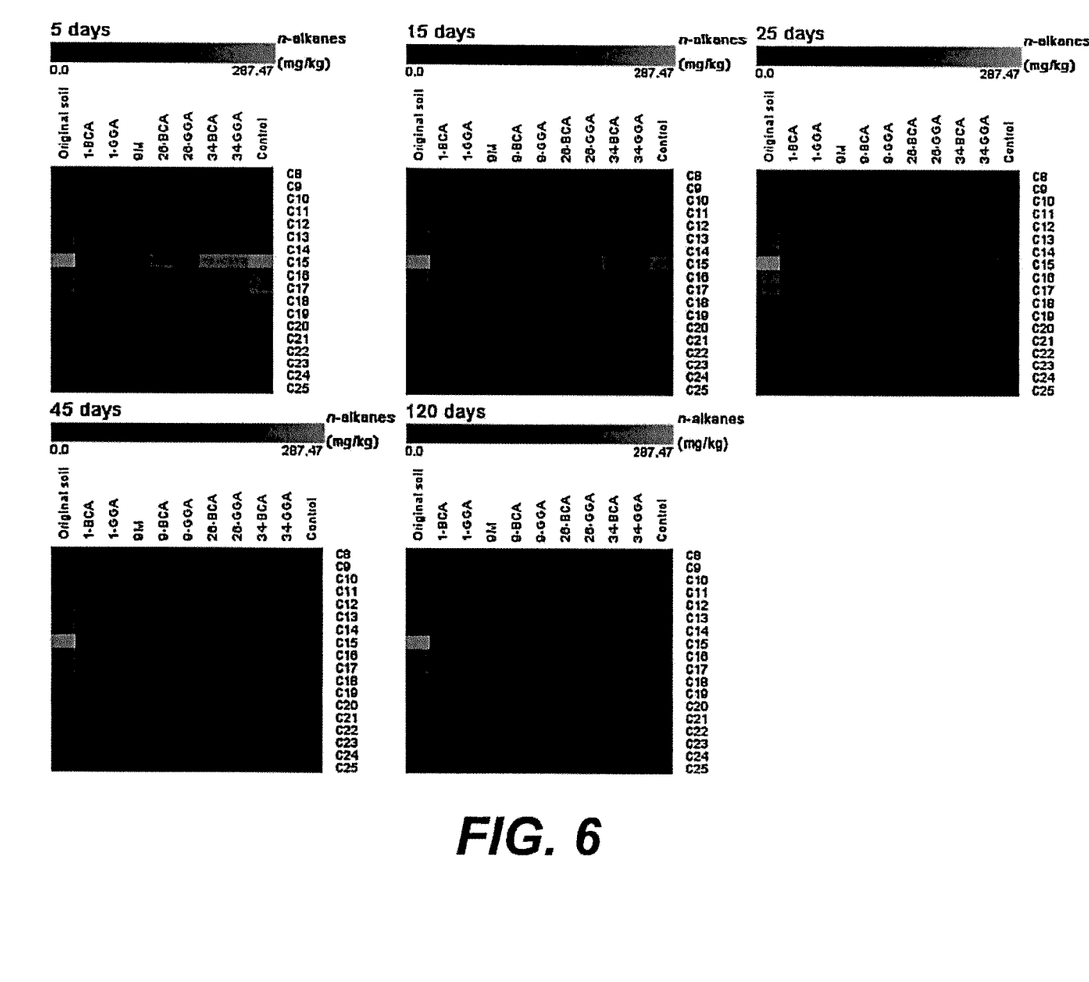
FIG. 6 depicts the concentration changes for n-alkanes ($C_8$-$C_{25}$) in a BES-soil reactor at different sampling times.

As the main constituents of diesel, n-alkanes were analyzed for soil samples. Alkanes containing C8 to C25 were detected and yielded a total n-alkane concentration. FIG. 6 shows a heat map of n-alkanes removal, with the brightness of the green columns indicating the concentrations of the n-alkanes with different carbon numbers. Similar to the results from the TPH removal tests, nearly all n-alkanes with 8-12 carbons at different BES radial distances from the anodes were degraded within 5 days (FIG. 6). Especially for $C_{10}$-$C_{12}$ portions with high biodegradability and bioavailability due to relative higher water solubility were decreased from 282 mg/kg-DS to an average of 25 mg/kg-DS. An approximately linear relationship between BES radial distance and the n-alkane biodegradation was observed, consistent with the TPH biodegradation results. For samples collected at once, for example on day 5, the larger the distance from the BES electrode, the brighter the green color is. This indicates less n-alkanes removal. For samples collected from the same location or ROI, the green color faded with time, confirming the removal of the carbon (hydrocarbons). As shown in the day 120 graph, all columns in active BES reactors turned black, indicating most n-alkanes degradation (77-86% total n-alkanes degradation) within 34 cm from each BES anode, while in the control 61% of n-alkanes were degraded.

Soil pH and Electrical Conductivity Changes with BES Radial Distance

Figure 7:
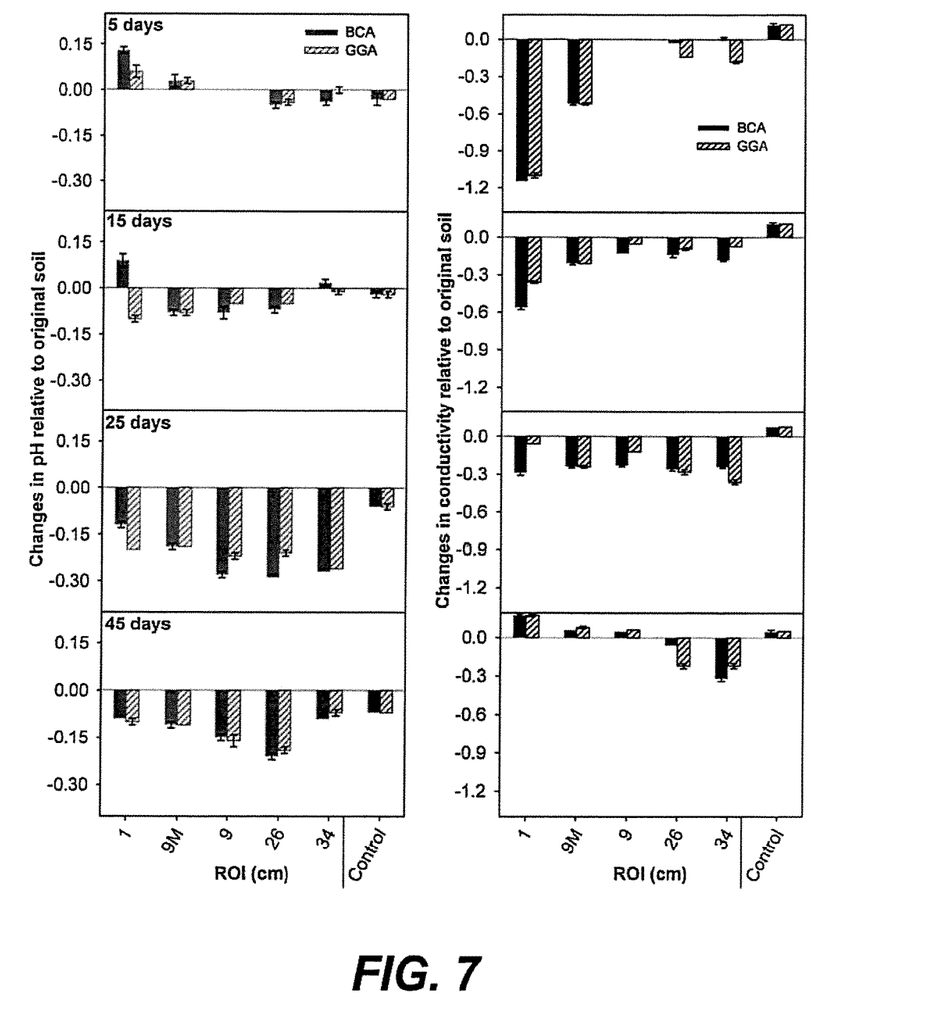
FIG. 7 illustrates the changes in soil pH and conductivity in the BES- and control reactors.

The soil pH values increased up to 0.13 within the first 5 days at a radial distance of 1 cm from the anodes of each BES (FIG. 7). This was presently attributed to the adsorption of ions and $H^+$ by the anode materials, which coincided with a 17-37% drop in electrical conductivity (EC). From days 5 to 25, the pH gradually decreased by 0.22 at each sampling point possibly due to formation of organic acids from hydrocarbon metabolism. However, the organic acids would likely be readily consumed, resulting in pH rebound. This was observed here, with a pH rebound of 0.13 on day 45. At the end of test, the soil EC increased near the anodes of each BES but decreased with distance. Ions migration driven by water loss at the cathodes towards electrode modules might be the one reason for this conductivity distribution. The possible generation of organic acids might cause the dissolution of minerals, which would release ions and may also increase ionic strength near the anodes. The pH and EC in the control remained relatively stable throughout the experimental period.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the components and steps in any sequence which is effective to meet the objectives there intended, unless the context specifically indicates the contrary.

What is claimed is:

1. A method for the remediation of a substrate comprising at least one contaminant, comprising:
   contacting a substrate comprising at least one contaminant with a bioelectrochemical system comprising:
      one or more BES columns, each comprising a central tube having one end open to the an oxygen-containing gaseous environment and a perforated opposite end configured for submersion into substrate;
      a cathode layer external to said central tube configured for encasing at least a portion of the perforated portion of said central tube;
      a separator layer external to said cathode layer, wherein said separator layer physically isolates said cathode layer from substrate;
      an anode layer external to said separator layer, wherein said separator layer physically isolates said anode layer from said cathode layer;
      a containment layer external to said anode layer; and
      an electrical current interface functionally connecting said anode layer to said cathode layer; and
   operating said system to reduce the amount of the at least one contaminant in said substrate, wherein said substrate is water-unsaturated soil.

2. The method of claim 1, wherein said at least one contaminant comprises at least one petroleum hydrocarbon compound.

3. The method of claim 1, wherein said at least one contaminant is selected from the group consisting of petroleum, crude oil, diesel fuel, gasoline, kerosene, aviation fuel, motor oil, heating oil, propane, ammonia, polyethylene glycol, sulfide, agricultural waste and biofuel.

4. The method of claim 1, wherein said substrate is a vadose zone.

5. The method of claim 1, wherein said one or more BES column comprises a ROI at least 11 times the radius of the column at 45 days.

6. The method of claim 1, wherein two or more of said BES columns comprise an array of BES columns.

7. The method of claim 6, wherein each BES column in said array is embedded in said substrate at a distance from neighboring BES columns in said array such that their predicted ROI at a target time point will meet or overlap one another in order to achieve a targeted suitable level of remediation.

8. The method of claim 1, wherein said electrical current interface is operably connected to at least one device for monitoring remediation of said substrate.

9. The method of claim 8, wherein said bioelectrochemical system generates a sufficient amount of electrical current to power said device without requiring the input of energy from other power sources.

10. The method of claim 8, wherein bioelectrochemical system generates more electrical current than what is required to power said device.

11. The method of claim 1, wherein said at least one BES column generates at least about 70 mA/m$^2$ electricity.

12. The method of claim 1, further comprising augmenting said substrate with at least one microbial species selected from the group of genera consisting of *Achromobacter, Actinomyces, Alcaligenes, Anaerovorax, Azospirillum, Bacillus, Bordetella, Clostridium, Comamonas, Enterobacter, Fulvimonas, Gemmatimonas, Gordonia,* Gp1, Gp3, Gp4, Gp6, Gp16, *Ilumatobacter, Meniscus, Mycobacterium, Nocardioides, Ochrobactrum, Olivibacter, Ohtaekwangia, Parvibaculum, Pseudomonas, Pseudoxanthomonas, Pusillimonas, Sedimentibacter, Shinella, Skermanella, Sphingobium, Sporomusa, Stenotrophomonas,* TM7_Genera_Incertae_Sedis, *Williamsia*, and mixtures thereof.

13. The method of claim 1, wherein said anode comprises biochar or granules.

\* \* \* \* \*